Dec. 15, 1970     L. J. BALL     3,546,745
EXTRUDATE SIZING SLEEVE

Filed Feb. 29, 1968     2 Sheets-Sheet 1

INVENTOR.
L. J. BALL
BY Young & Quigg
ATTORNEYS

Dec. 15, 1970     L. J. BALL     3,546,745
EXTRUDATE SIZING SLEEVE
Filed Feb. 29, 1968     2 Sheets-Sheet 2

INVENTOR.
L. J. BALL
BY
*Young & Quigg*
ATTORNEYS

United States Patent Office 3,546,745
Patented Dec. 15, 1970

3,546,745
EXTRUDATE SIZING SLEEVE
Lawrence J. Ball, Bartlesville, Okla., assignor to Phillips Petroleum Company, a corporation of Delaware
Filed Feb. 29, 1968, Ser. No. 709,261
Int. Cl. B29d 23/04
U.S. Cl. 18—14       4 Claims

ABSTRACT OF THE DISCLOSURE

A sizing sleeve is provided with a plurality of internally flat threaded sections, the threads at adjacent sections extending in opposite directions. The minor diameter, or crest diameter, of the threads is the desired external diameter for the extrudate. Coolant is introduced into the grooves between the thread crests at alternate section lines and withdrawn at the other alternate section lines to provide short paths of flow of coolant in direct contact with the external surface of the extrudate.

---

This invention relates to apparatus for sizing extruded thermoplastic tubing. In the synthetic plastics fabricating industry, it is the usual practice in making thermoplastic tubing to extrude molten thermoplastic, such as polyethylene, polypropylene, poly(vinyl chloride) and the like, through an annular die in the form of tubing. The extruded tubing is shaped to the desired size by a sizing tube or the like and then cooled with water. The production rate of the tubing is limited by the hot melt strength of the thermoplastic material and the time required to cool the extruded tubing to the point where the tubing retains its shape. The length of the sizing sleeve has been a factor in determining the cooling time. If the sleeve is too short for the rate of extrusion, the tubing is not sufficiently rigid on leaving the sizing sleeve and the shape of the tubing changes. If the sizing sleeve is long enough to provide the desired residence time at high extrusion rates, the increased drag or resistance of the passage of the tubing through the sleeve exceeds the strength of the tubing, with the result that the tubing puller draws down or even breaks the tubing.

Accordingly, it is an object of the invention to provide a sizing sleeve having a sufficient length to permit adequate crystallization of the extrudate and having means for passing a coolant into direct contact with the external surface of the extrudate and the internal surface of the sizing sleeve to prevent the extrudate from sticking to the sleeve. It is an object of the invention to prevent heat build-up in an extrudate sizing sleeve. Another object of the invention is to provide an extrudate sizing sleeve which can function properly at high rates of extrusion. Another object of the invention is to provide a sizing sleeve with means for maintaining a desired temperature profile.

Other objects, aspects and advantages of the invention will be apparent from a study of the specification, the drawings and the appended claims to the invention.

Figure 1:
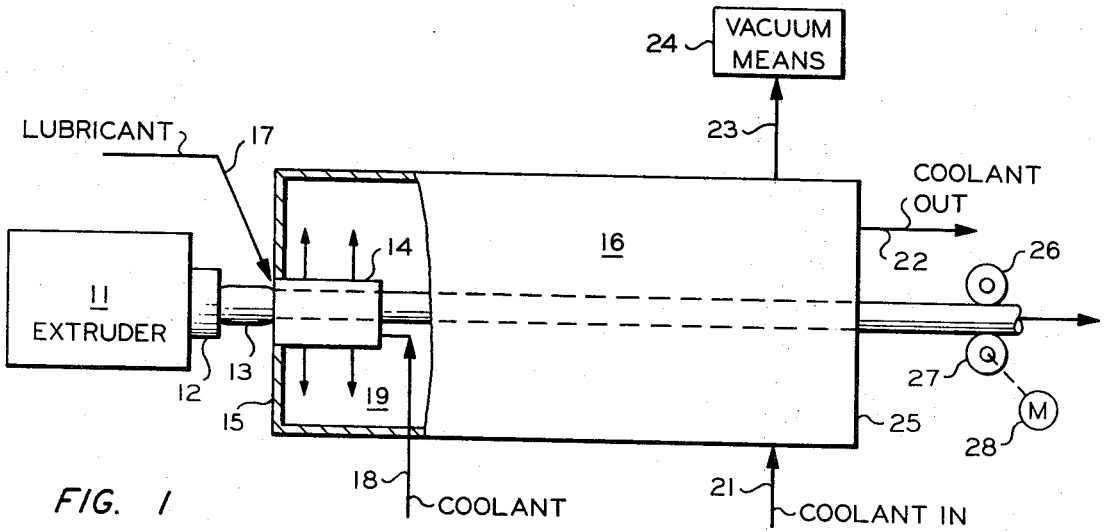
Figure 2:
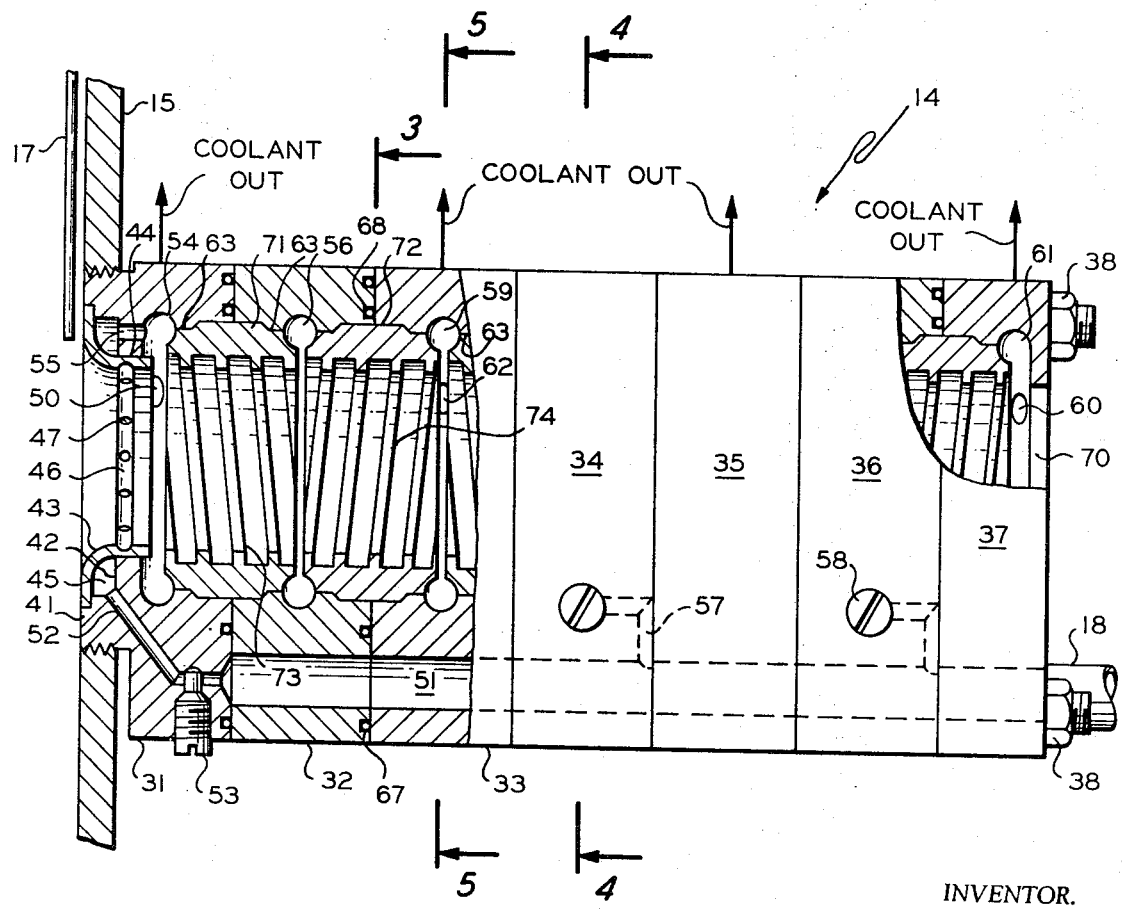
Figure 3:
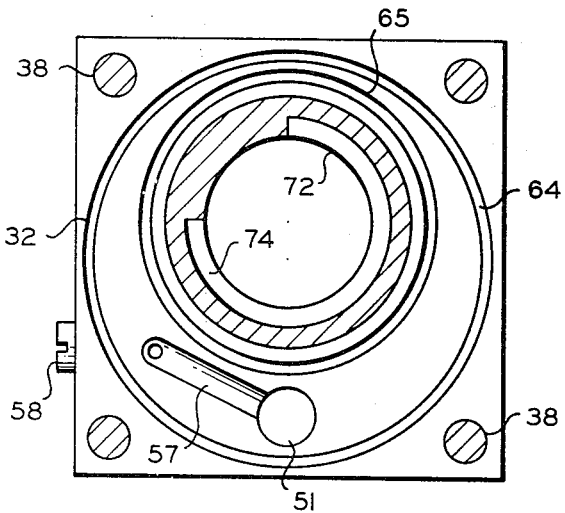
Figure 4:
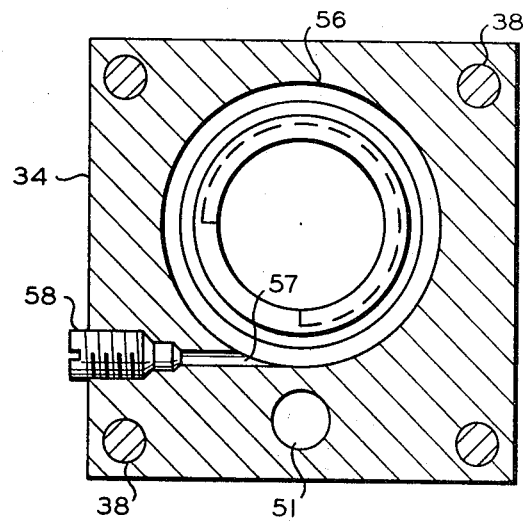
Figure 5:
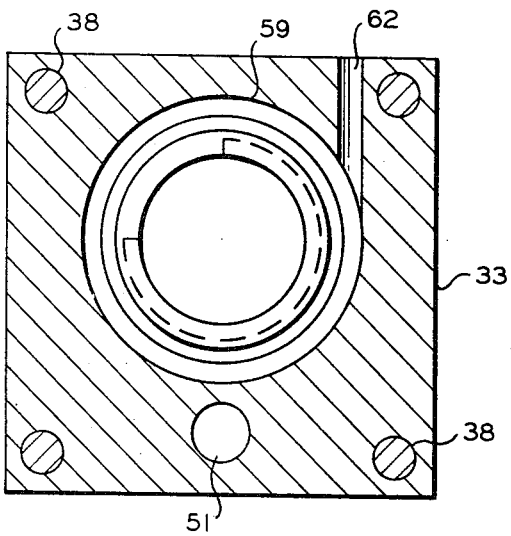

In the drawings, FIG. 1 is a diagrammatic side elevation, partially in section, of one form of apparatus embodying the invention; FIG. 2 is an enlarged side elevation view, partially in cross section, of the sizing tube of FIG. 1; FIGS. 3, 4 and 5 are cross sectional views taken along lines 3—3, 4—4, and 5—5, respectively, in FIG. 2.

Referring now to FIG. 1, extruder 11 is provided with a die 12 for the extrusion of tubing 13. The extruded tubing 13, still in a molten condition, is passed through a sizing sleeve 14, mounted in wall 15 of a gas-tight water bath 16. A lubricant from conduit 17 is applied to the surface of tubing 13 as the tubing enters sleeve 14. Water is passed through conduit 18 into and through grooves in the interior surface of sleeve 14 in direct contact with the exterior surface of tubing 13 and then through outlets in sleeve 14 into the interior chamber 19 of water bath 16. Additional water is passed by way of conduit 21 into chamber 19. Water is removed from water bath 16 by way of conduit 22. Conduit 23 communicates between chamber 19 and a vacuum means 24 to maintain the pressure in chamber 19 at a subatmospheric value. The interior of tubing 13 is exposed to the atmosphere, thus creating a pressure differential which urges the tubing against the sizing surface on the inside of sleeve 14. The cooled tubing passes through a gas tight opening in wall 25 of water bath 16 and between rollers 26 and 27. Roller 27 is driven by variable speed motor 28 to apply tension along the longitudinal axis of tubing 13 for pulling the tubing through the water bath.

Referring now to FIGS. 2 through 5, sizing sleeve 14 is made up of rectangular sections 31, 32, 33, 34, 35, 36 and 37 having an elongated cylindrical shaping channel therethrough and held together by four bolts 38. Sections 32, 34 and 36 are identical to each other, and sections 33 and 35 are identical to each other. The nose section 31 is provided with a cylindrical shank 41 having threads in the external surface thereof for sealing engagement with wall 15. The inner surface of shank 41 is recessed to provide a shoulder 42. A sizing ring 43 having the inlet end flared outwardly is positioned within nose section 31, with the inlet end of ring 43 being soldered to the end of shank 41 and the outlet end of ring 43 being soldered to the inner surface 44 of shoulder 42, to form a liquid passageway 45 around ring 43. Circular groove 46 is formed in the inner surface of ring 43 in line with shoulder 42. Vent holes 47 are drilled through ring 43, shoulder 42 and the body of nose section 31 to provide communication between groove 46 and the external surface of section 31. Vent holes 47 permit gases or vapors that may be trapped between the extrudate 13 and sizing ring 43 to escape into the water surrounding sizing sleeve 14. Vent holes 47 are small enough to prevent the flow of water from water bath 16 through holes 47 to the sizing ring under normal operating conditions.

Conduit 18 is connected to an inlet manifold passageway 51 which extends through sections 37, 36, 35, 34, 33 and 32 and into nose section 31. Passage 52 in nose section 31 provides communication between passageway 51 and passageway 45. A valve 53 is operatively positioned in nose section 31 to vary the flow of water through passageway 52 to passageway 45 behind sizing ring 43. The interior surface of nose section 31 is provided with a circular groove 54. A passageway 50 in nose section 31 enables the flow of water from groove 54 to the exterior of sizing sleeve 14. Shoulder 42 is provided with at least one opening 55 therethrough to pass water from passageway 45 into circular groove 54. Thus, water flows from conduit 18 through passageways 51, 52 and 45 into contact with sizing ring 43 and then through opening 55 and groove 54 and the outlet passageway 50 into the water bath chamber 19. Valve 53 is adjusted to provide the desired flow rate of water, while vacuum means 24 maintains the pressure of the water in groove 54 slightly below atmospheric pressure. Vent holes 47 and openings 55 are spaced apart and are not interconnected.

Each of sections 32, 34 and 36 is provided with circular groove 56 in the interior surface thereof, located approximately in the middle of the length of the section. Each of sections 32, 34 and 36 is also provided with a passageway 57 which connects the manifold passageway 51 to the respective circular groove 56. Each passageway 57 is provided with a valve 58 positioned therein to regulate the flow rate of water through the respective passageway 57. Each of sections 33 and 35 is provided with a circular groove 59 in the interior surface thereof at approximately the midpoint of the length of the section. Section 37 is provided with a circular groove 61 in the interior surface thereof adjacent the downstream end though which tube 13 exits from sleeve 14. Section 37 is provided with an inwardly directed flange 70 at its downstream end to form a circular opening having a diameter equal to the minor diameter of the threads 73 and 74. Each of sections 33 and 35 is provided with an outer passageway 62 which communicates between the respective circular groove 59 and the exterior of sleeve 14. Section 37 is provided with a similar outlet passageway 60 for groove 61. Each of sections 31–36 is provided with grooves 64 and 65 containing O-rings 67 and 68, respectively, in the downstream face thereof, as illustrated in FIG. 3.

Each of sections 32–36 has raised shoulders 63 on each side of the circular groove contained therein, while each of nose section 31 and end section 37 has a similar shoulder downstream and upstream, respectively, of the circular groove contained therein. Internal sections 71 and 72 are annular sleeves having a maximum external diameter corresponding to the internal diameter of outer sleeves 31–37, with recesses in the leading and trailing edges corresponding to shoulders 63. Sleeve 71 is positioned inside outer sections 31 and 32 in the space between circular grooves 54 and 56, with the leading recess on sleeve 71 abutting the shoulder 63 of section 31 and the trailing recess on sleeve 71 abutting the leading, or upstream, shoulder 63 on section 32. Sleeve 72 is similarly positioned inside of outer sections 32 and 33 in the space between circular grooves 56 and 59. Each of sleeves 71 and 72 is shorter in length than each of outer sections 32–36, thus leaving a gap between the adjacent ends of the sleeves 71 and 72. Sleeve 71 is provided with internal, right-hand threads 73 (when viewed from the upstream end of sizing sleeve 14), while sleeve 72 is provided with internal, left-hand threads 74. Sleeves identical to sleeve 71 are positioned in the space bridging sections 33 and 34 and the space bridging sections 35 and 36, while sleeves identical to sleeve 72 are positioned in the space bridging sections 34 and 35 and the space bridging sections 36 and 37. Threads 73 and 74 are preferably rectangular threads, but can be other forms of threads having flat crests. The minor diameter of the threads, that is, from crest to crest, is the same as the minimum internal diameter of sizing ring 43, and thus is the desired external diameter for tubing 13. The major diameter of the threads 73 and 74 and the root distance (distance between threads) of threads 73 and 74 are sufficiently large to provide the desired flow rate of water between the threads and in contact with the external surface of pipe 13 without requiring high pressures. Water flows from manifold passageway 51 through passageway 57 and circular groove 56 in section 32, and between the adjacent ends of sleeves 71 and 72. A first portion of the water flows through the helical paths between threads 73 into contact with the exterior surface of the extrudate, through circular groove 54, and then through passageway 50 into the water bath chamber 19. The second portion of the water flows through the helical path between threads 74 in contact with the exterior surface of the extrudate, and through circular groove 59 and passageway 62 into water bath chamber 19. Thus water is introduced into the joinder of a pair of reverse threaded sections 71 and 72 where the threads of the two sections provide diverging flow paths with respect to each other, and is withdrawn from the joinder of a pair of reverse threaded sections 71 and 72 where the threads of the two sections are converging with respect to each other in the direction of the flow of the water. In the embodiment described, grooves 56 are the inlet grooves 54, 59 and 61 are the outlet grooves. However, the direction of water flow could be reversed with pipe 18 being connected to passageways 50, 60 and 62 and manifold passageway 51 being open to the water bath; in which event, grooves 54, 59 and 61 would serve as inlets while grooves 56 would be outlets for the helical flow paths. The use of short helically threaded sections 71 and 72 in alternation permits the flow paths of water from the manifold passageway 51 through the helical flow paths between the threads to be short to minimize the pressure drop involved and to minimize the variations in the differential pressure across the wall of the extrudate. This also results in maximum cooling for a given differential pressure. The faster cooling of the extrudate permits a greater takeout speed by roller 27.

While it is presently preferred to maintain a substantially uniform temperature throughout the length of sizing sleeve 14, valves 58 permit individual adjustment of the water flow rate through each pair of inner sleeves 71 and 72. Thus, a uniform gradient or other temperature profile can be established and maintained.

The following example is presented in further illustration of the invention but should not be construed in undue limitation of the invention.

CONTROL

In a first series of runs, polypropylene having a density of 0.905 (ASTM D1505—63%), a melt flow of 1 (ASTM D1238–62T, Condition L) and a crystalline melting point of 340° F. was extruded at approximately 425° F. as tubing having a 24 mm. outer diameter and a wall thickness of 150 mills. The molten tubing was passed through a sizing sleeve into a vacuum water bath. The sizing sleeve comprised a sizing ring of the shape of ring 43 with an annular thin wall sleeve attached to the downstream end of the ring. The tubing contacted the sizing ring and the inside surface of the annular sleeve. The ring and annular sleeve had an overall length of 1½ inches. In some of the first series of runs water was continuously sprayed directly onto the exterior surface of the annular sleeve. In all of the first series of runs city tap water was continuously introduced into the water bath and water was continuously withdrawn to maintain a constant temperature in the water bath of approximately 70° F. The highest extrusion rate which could be sustained with good quality tubing with or without the water spray was 2 feet of tubing per minute. The extrusion rate could be increased to 5 feet per minute with the water spray but the surface of the tubing was rough, indicating that sticking between the tubing and the sizing sleeve was occurring. Extrusion rates over 5 feet per minute could not be maintained due to neck down of the tubing resulting from the tubing sticking to the sizing sleeve.

EXAMPLE

In a second series of runs utilizing the same polypropylene, extrusion temperature, tubing outer diameter, tubing wall thickness and water bath temperature, but with a sizing sleeve of the construction of FIG. 2 having an overall length of 6¾ inches, with part of the tap water being supplied directly to conduit 18, good quality tubing was consistently produced at an extrusion rate of 15 feet of tubing per minute and tubing having only a slightly roughened surface was formed at an extrusion rate of 22 feet per minute, the limit of the extruder.

Thus the sizing sleeve of the invention permits the production of the same quality tubing for a given size at production rates of approximately three times the maximum production rate of the previously used sizing sleeve.

Reasonable variations and modifications are possible within the scope of the foregoing disclosure, the drawings and the appended claims to the invention.

I claim:
1. A device for sizing molten, extruded tubing wherein the interior of said tubing is exposed to a first pressure and the exterior of said tubing is exposed to a second pressure lower than said first pressure, which comprises in combination: a sizing sleeve having an elongated substantially cylindrical shaping channel therethrough for the passage of said tubing, the interior surface of said sleeve which defines said channel having at least four sections positioned sequentially and provided with grooves which are inclined to the axis of said channel, said grooves being the spaces between internal threads having a substantially flat crest, the minor diameter of said threads being the desired external diameter for said tubing, said grooves of alternate sections being formed by right hand threads and the grooves of the remaining sections being formed by left hand threads, and wherein adjacent sections are separated by a circular groove; means communicating with adjacent ends of an adjacent pair of said sections for passing a coolant through the groove of said pair of sections into direct contact with the exterior surface of said tubing as said tubing passes through said channel, the angles of inclination of the grooves of said pair of sections with respect to the axis of said channel being in opposite directions with respect to each other so that the groove of one section of said pair of sections diverges from the groove of the other section of said pair, said means for passing a coolant comprising a manifold and a plurality of conduit means communicating between said manifold and a respective one of an alternating set of said circular grooves; means communicating between the groove of said one section at the end opposite to said adjacent ends and the exterior of said sizing sleeve for the withdrawal of coolant therefrom and between the groove of said other section at the end opposite to said adjacent ends and the exterior of said sizing sleeve for the withdrawal of coolant therefrom, said means for the withdrawal of coolant comprising passageways in said sizing sleeve communicating between the remaining alternating set of said circular grooves and the exterior surface of said sizing sleeve; and a sizing ring positioned at the inlet of said channel, the minimum internal diameter of said sizing ring being equal to said minor diameter of said threads, the inlet end of said sizing ring being flared outwardly.

2. A device in accordance with claim 1 further comprising a passageway connected to said manifold and passing around said sizing ring to provide cooling for said sizing ring.

3. A device in accordance with claim 2 further comprising valve means located in each of said plurality of conduit means and in said passageway passing around said sizing ring.

4. A device in accordance with claim 3 further comprising a gas tight water bath housing, means for introducing water into said housing to form a water bath, said sizing sleeve being mounted in said water bath whereby said tubing passing through said sizing sleeve exists from said sizing sleeve into said water bath, and means for maintaining the pressure in said water bath sufficiently low so that the pressure of the coolant in the grooves between said threads is below the pressure on the inside of said tubing to force said tubing against the crest surface of said threads.

References Cited
UNITED STATES PATENTS 2,947,032    8/1960    Taylor    18—14
3,144,494    8/1964    Gerow    18—14X

FOREIGN PATENTS 802,939    10/1958    Great Britain.

J. SPENCER OVERHOLSER, Primary Examiner